United States Patent [15] 3,676,645
Fickenscher et al. [45] July 11, 1972

[54] DEEP FIELD OPTICAL LABEL READER INCLUDING MEANS FOR CERTIFYING THE VALIDITY OF A LABEL READING

[72] Inventors: William E. Fickenscher, 1229 Knightswood Road, Baltimore, Md. 21212; James E. Harris, 2 Harmon Road, Owings Mills, Md. 21117

[22] Filed: April 9, 1970

[21] Appl. No.: 27,051

[52] U.S. Cl. ..........................235/61.11 E, 178/7.6, 250/233, 340/146.3 T

[51] Int. Cl. ......................G06k 7/14, G01d 5/36, H04n 3/34, G06k 9/04

[58] Field of Search ................250/219 D, 233; 235/61.11 F; 178/7.6; 340/146.3 J, 146.3 RR, 345, 146.3 T

[56] References Cited

UNITED STATES PATENTS

| | | | |
|---|---|---|---|
| 3,409,760 | 11/1968 | Hamisch | 235/61.12 N |
| 3,414,731 | 12/1968 | Sperry | 250/219 D |
| 3,417,231 | 12/1968 | Stites | 235/61.11 E |
| 3,474,230 | 10/1969 | McMillen | 235/61.7 R |
| 3,495,036 | 2/1970 | Clayton | 178/7.6 |
| 3,497,704 | 2/1970 | Holmes | 250/233 |
| 3,543,007 | 11/1970 | Brinker | 235/61.11 E |
| 3,106,706 | 10/1963 | Kolanowski | 340/345 |
| 3,104,372 | 9/1963 | Rabinow | 340/146.3 AG |
| 3,553,433 | 1/1971 | Sorli | 235/61.7 R |
| 3,278,900 | 10/1966 | Wood | 340/146.3 C |

OTHER PUBLICATIONS

Allen–Data Comparison Device Dec. 1959–IBM Tech. Disclosure Bulletin; Vol. 2, No. 4, pp. 123–124

Tibbetts–Simplified Optical Unit for A Page Scanner–Nov. 1965–IBM Tech. Diclosure Bulletin Vol. 8, No. 8, p. 885

Buckson–Def. Pub. of SN702459, filed 02–01–68, published in 861 O.G. 1356, on Apr. 29, 1969

*Primary Examiner*—Maynard R. Wilbur
*Assistant Examiner*—Robert M. Kilgore
*Attorney*—Plante, Arens, Hartz, Smith & Thompson, Bruce L. Lamb and William G. Christoforo

[57] ABSTRACT

A label reader includes a rotating faceted mirror which scans a beam from a low power gas laser repetitively across a conveyor. The beam path is within the viewing angle of a phototransducer. A package having a specially marked label thereon which passes through the beam excites the phototransducer in response to the label markings. The light received by the photosensor will thus be modulated in accordance with the label markings as scanned. The output of the phototransducer is thus a pulse train which is analyzed in a logic circuit to determine first that a label is being read and second to determine the validity of informational content on the label. Extreme depth of the reader field is provided by the laser which provides a coherent non-dispersive light source and additionally by a sensor which detects the distance of the label being read from the label reader and modifies the logic circuitry in accordance therewith.

31 Claims, 10 Drawing Figures

FIG. I

INVENTORS
WILLIAM E. FICKENSCHER
JAMES E. HARRIS
BY
William G. Christoforo
ATTORNEY INVENTORS
WILLIAM E. FICKENSCHER
JAMES E. HARRIS
BY
William G. Christoforo
ATTORNEY INVENTORS
WILLIAM E. FICKENSCHER
JAMES E. HARRIS
BY
William G. Christoforo
ATTORNEY INVENTORS
WILLIAM E. FICKENSCHER
JAMES E. HARRIS
BY
William G. Christoforo
ATTORNEY

DEEP FIELD OPTICAL LABEL READER INCLUDING MEANS FOR CERTIFYING THE VALIDITY OF A LABEL READING

BACKGROUND OF THE INVENTION

This invention relates to pattern recognition equipment and more particularly to equipment able to recognize and decipher a distinct coded label even though the label may be presented at varying distances from the recognition equipment.

Automatic label readers are known to substantially increase the operating efficiency in automated warehouses and in other various material handling and sorting systems. The automatic label reader replaces the key punch operation which is currently widely employed and thus alleviates the worse bottleneck in most existing sorting systems. Additionally, the manual encoding operation which is presently required in nearly all automated sorting systems wherein label data is read by an operator and then manually transferred to automatic sorting equipment or to an escort memory is particularly slow and error prone. Errors due to incorrect encoding are particularly vexing since they are extremely difficult to discover as these errors are usually discovered only by further human operator investigation.

Certain automatic label readers are already known but these are generally restricted in their use in that their field of view, that is the distance between the label reading mechanism and the label itself, must be controlled within fairly tight limits. In other words, the depth of field of these prior art automatic label readers is quite limited.

SUMMARY OF THE INVENTION

There is described herein an optical label reader which scans coded information on a label generally affixed to a package which generally is moving past the label reader at a possible high rate of speed. It will also be shown how the optical label reader herein has a wide tolerance for label orientation in a wide depth of field. Logic circuitry is also described which assures with a high degree of confidence the validity of the reading.

The operation of the optical label reader is as follows. Sorting information is encoded into a series of bars on a label. The label is affixed by conventional means onto a package. The package is then presented to the optical reader preferably by moving past the optical label reader on a conveyor. The label passes through an illuminator which is comprised of a laser beam rapidly scanned across the label bars. The label coding is sensed optically and converted by a phototransducer into electronic signals which are processed in logic circuitry to determine that, in fact, a label has been read. The electronically coded signals may now be transferred to sorting controls, an escort memory, or other like handling equipment or may be used for inventory or like accounting purposes.

Other means are provided to sense the proximity of the label being read to the label reader and to adjust the aforementioned logic circuitry in accordance with this information so that the label can be correctly read regardless of its distance from the label reader, with limits, of course, generally dictated by the sensitivity of the phototransducer and the dispersion of scanning light beam and its reflected beam. Where the coherent light beam of a laser is used for scanning the dispersion of the light beam from the light source to the label is of negligible effect. Additionally, other logic circuitry permits the label to be correctly read in either direction, that is, the label will be correctly read regardless of the direction of laser scan across the label. A scheme of marking the labels and associated logic circuitry is also provided and described herein to provide assurance with a high degree of confidence that the label will be correctly read and that spurious noise signals will be rejected and have little or no effect upon the electronic encoding of the label information.

It is thus an object of this invention to provide an optical label reader.

It is another object of this invention to provide an optical label reader which is suitable for use in material handling, accounting and other like systems.

It is a further object of this invention to provide an optical label reader which has a wide tolerance of label orientation.

One more object of this invention is to provide a label suitable for use with an optical label reader.

Another object of this invention is to provide an optical label reader of the type described and which is highly reliable and accurate.

Still another object of this invention is to provide an optical label reader which is generally immune to spurious noise and false signals.

DESCRIPTION OF THE PREFERRED EMBODIMENT

Figure 1:
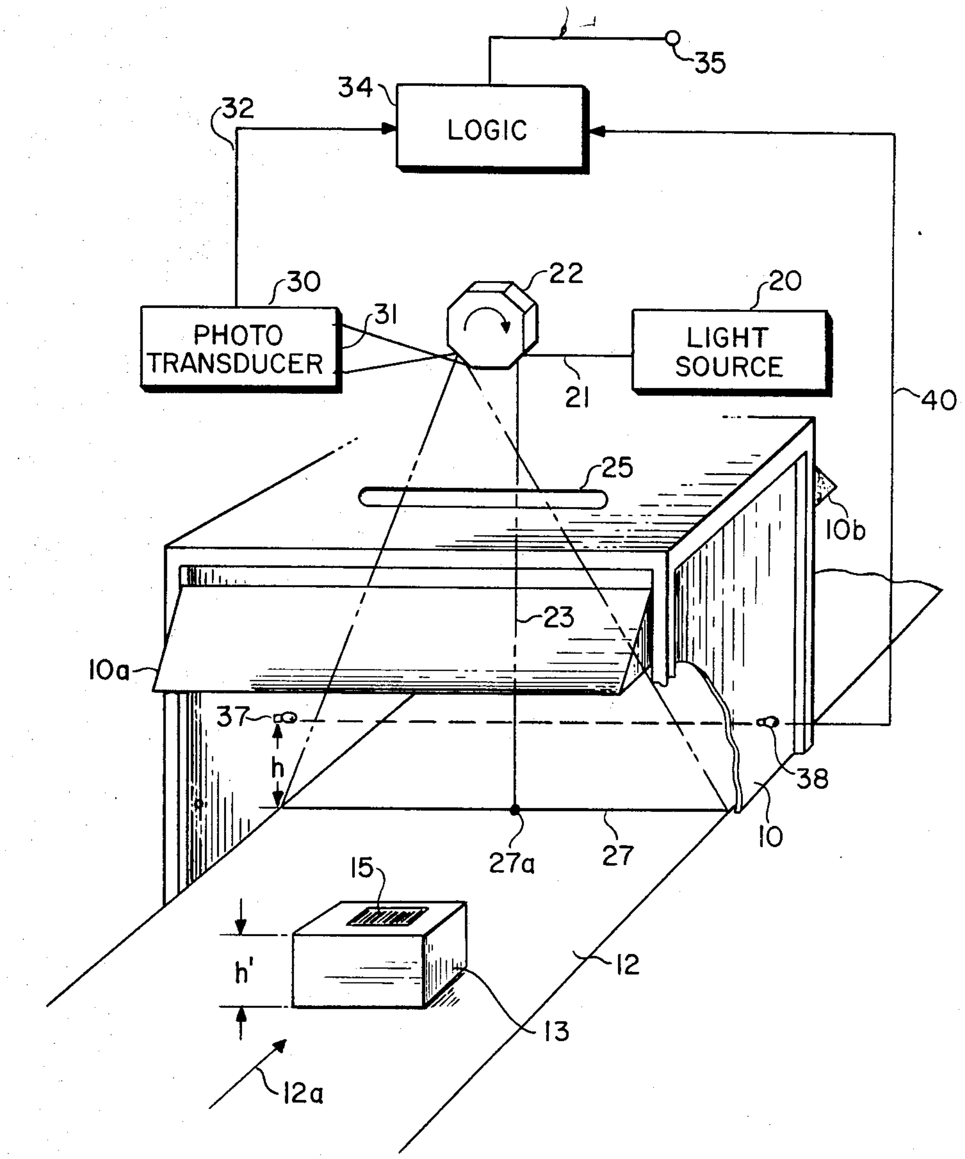
FIG. 1 shows the general arrangement of the mechanical elements of the invention, the invention being used with a material conveyor.

Referring first to FIG. 1 wherein there is seen in stylized representation the mechanical elements of an optical label reader positioned astride a material handling conveyor 12. The optical label reader is comprised of a hood 10 sitting astride conveyor 12 and which provides a light shield over the conveyor in a conventional manner by means of its basic configuration together with overhangs 10*a* and 10*b*. Since a label passing under hood 10 will be illuminated by a scanning light source, it is desirable that the ambient light on the label be held to a minimum during the scanning period. Hood 10 accomplishes this function. A package 13 having a label 15 affixed thereto is supported by conveyor 12 which is moving in the direction of the arrow 12*a* so as to carry package 13 under and through hood 10. A light source 20, preferably a coherent light source such as a low power gas laser, provides a narrow beam of light 21 which is projected upon a rotating faceted mirror from whence it is reflected as beam 23 through slot 25 in the top surface of hood 10 and, for the orientation of the rotating mirror 22 shown in the figure, onto point 27*a*. The axis of rotation of multi-faceted mirror 22 is generally parallel to the direction of movement of conveyor 12 so that reflected light beam 23 will sweep a path across conveyor 21 transverse to its direction of motion and is illustrated by line 27. For clarity, the mean of support and rotation of mirror 22 are not shown. However, it should be obvious that this means can provided be provided by a motor having a rotating shaft on which mirror 22 is concentrically mounted.

Figure 9:
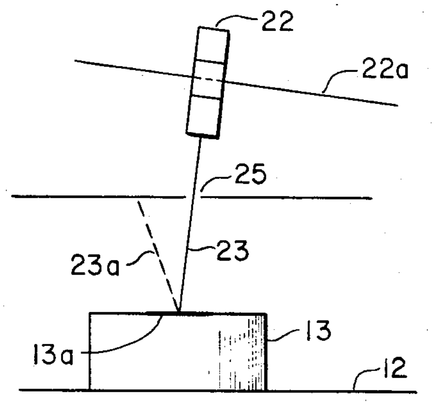
FIG. 9 is a view of the scanning mirror in relation to a label being read and shows a means of preventing highly reflective surfaces in the path of the scanning beam from poisoning the phototransducer.

In actual practice it has been found desirable to depress one end of the axis of rotation of mirror 22 towards conveyor 12 so that the aforementioned axis of rotation although still aligned in the direction of movement of conveyor 12 now forms an extremely shallow angle with conveyor 12. In this manner, the scanning line 27 remains perpendicular to the direction of movement of conveyor 12, however, highly reflective areas passing through beam 23 now cause reflection of the beam generally away from slot 25. Thus extremely high peaks of illumination are not reflected directly back through slot 25 and onto mirror 22 and thus into phototransducer 30. This arrangement is shown more clearly in FIG. 9 wherein the axis of rotation 22*a* of multi-faceted mirror 22 is shown depressed at one end towards conveyor 12 so that light beam 23 reflected from mirror 22 and passing through slot 25 if it impinges upon a highly reflected surface, for example surface 13*a* on package 13, it is reflected in the main along line 23*a* away from slot 25. Thus the strongly reflected beam 23*a* is shielded from phototransducer 30 of FIG. 1.

Of course, if light beam 23 strikes a dispersively reflective area on package 13 including the label to be described a major portion of the light will be directed back through slot 25 to be thus observed by phototransducer 30 of FIG. 1.

Returning now to FIG. 1, there is seen a phototransducer 30 suitably a photo multiplier tube, channeltron or similar photo electric transducer, which has a generally wide observation area, seen in end view as line 31, which is much wider than beam 21. Observation area 31 is directed towards mirror 22 so that it observes at all times regardless of the rotation of mirror 22 at least through slot 25 and line 27. As light beam 23 scans along line 27, it strikes various dark or light portions in its path, for example, markings on label 15 as it passes through the hood. The light returned through slot 25 thereby and observed by phototransducer 30 causes electrical signals to be generated along line 32 which are supplied to logic circuitry generally designated as block 34. These electrical signals which are related to the light patterns observed by transducer 30 which are in turn related to the markings on label 15 are processed in logic circuitry as will be fully explained below, with logic circuitry output signals suitable for use as previously described appearing at terminal 35.

A light source 37 fixed to one side of hood 10, directed generally parallel to the top surface of conveyor 12 and spaced a predetermined distance thereabove illuminates a photo detector 38 located on the opposite wall of hood 10 and at the same distance *h* above conveyor 12. So long as the height *h'* of package 13 is less than distance *h* of light source 37 and photo detector 38 above the surface of conveyor 12 the light beam will not be interrupted, indicating that package 13 is of a height less than *h*. However, if the height *h'* of package 13 is greater than distance *h*, the light beam will be interrupted and a signal will be generated by photo detector 38 which will be conveyed along line 40 to logic circuit 34 which will thereby be adjusted to compensate for the changed distance between the label reader and the label being read for reasons and in a manner to be explained below.

Figure 2:
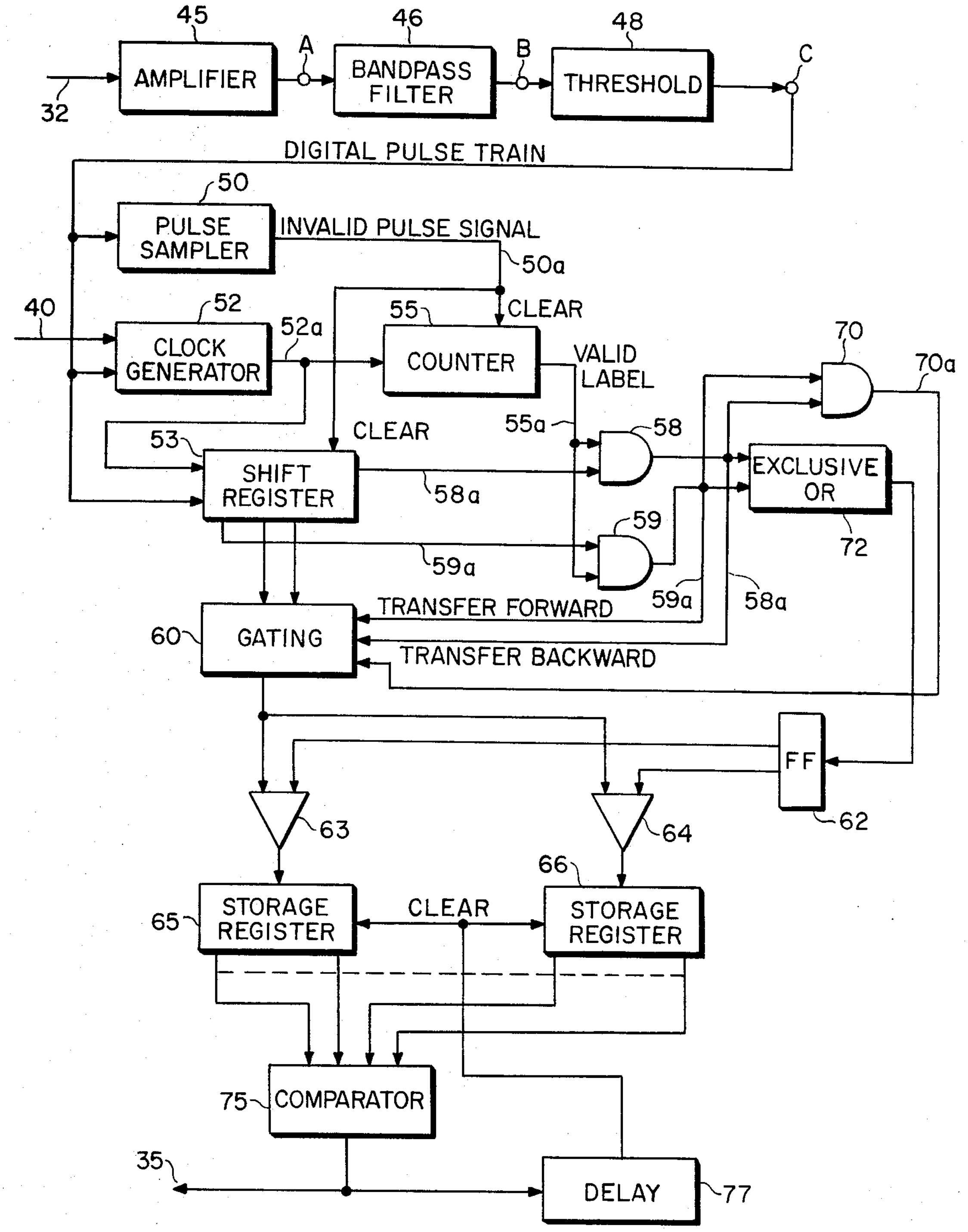
FIG. 2 is a block diagram of the logic circuitry of the invention.

Referring now to FIG. 2, a block diagram of the logic circuitry 34 of FIG. 1, electrical signals corresponding to the informational content of a label being read and generated by the phototransducer 30 of FIG. 1 are supplied via line 32, which is also seen in FIG. 1, to amplifier 45 wherein these signals are amplified, the amplified signals appearing on terminal A. These terminal A signals can be seen in FIG. 8A to include a noise which is indicated in this latter figure by the high frequency sine wave riding on top of the basic square wave pulse train. The terminal A signals pass through the bandpass filter 46 wherein both high frequency and low frequency noise is removed thus converting the waveform of FIG. 8A to the waveform of FIG. 8B which now appears on terminal B, the pulses now having a quasi-gaussian form. These pulses are detected by threshhold 48 wherein they are transformed into the square wave pulse train having a minimum of noise as seen in FIG. 8C. This pulse train appears on terminal C which is the input terminal for pulse sampler 50, clock generator 52 and shift register 53.

In this particular embodiment it is desired that information being processed in the logic circuitry be converted to binary, digital format. Additionally, and as is more fully explained below, the label being read will cause a train of pulse width modulated pulses to appear at terminal C. Also, as will be explained below, the system designer predetermines the range of pulse widths required to pulse width modulate the terminal C train to thus contain the label information in binary form. All pulses in the terminal C train having widths within this range are defined as valid while pulses outside this range, either narrower or broader, are defined as invalid. Pulse sampler 50 determines whether pulses at its input terminal are valid. If at any time pulse sampler 50 determines that a pulse at its input is an invalid pulse i.e., a pulse which would not be expected from reading a label, an invalid pulse signal is generated along line 50*a* and applied to shift register 53 and counter 55 to clear both of these elements to their initial state, which is suitably the zero state.

Clock generator 52 is comprised of means which in response to an input pulse train generates a corresponding train of clock pulses or spikes which are counted by counter 55 and which are also applied to shift register 53 to strobe into that register the pulse train at its input. It can be seen that electrical signals from photo detector 38 of FIG. 1 which appear on line 40 are applied to clock generator 52. It will be shown in fuller detail below how these signals alter the operation of the logic circuitry to compensate for the varying distance of the label from the label reader.

So long as valid pulses appear on terminal C pulse sampler 50 will not generate an invalid pulse signal, thus a number corresponding to the total number of pulses which have appeared on terminal C since the last invalid pulse will be accumulated in counter 55. These pulses will also be entered into shift register 53. For the embodiment shown it is assumed that regard less of the informational content on the label the total number of valid pulses resulting from reading a label will be identical for each label. Since this total number of pulses resulting from reading a valid label is predetermined, it is now obvious that counter 55 can be predetermined to generate a valid label signal along line 55*a* whenever it attains this predetermined count thus indicating, at least in part, that a valid label has been read. It will also be remembered that at any time an invalid pulse is recognized counter 55 will be cleared thus preventing the valid label signal from being generated at least until a valid label is once again scanned. These provisions of the logic circuitry that the proper number of valid pulses be counted before the reader recognizes that a valid label reading has been made together with other functions to be described below ensure a high degree of confidence in the output of the label reader.

The valid label signal is applied to AND gates 58 and 59, with gate 58 also receiving as an input via line 58*a* a sample of the last digit contained in shift register 53 and gate 59 receiving as an input via line 59*a* a sample of the first digit contained in shift register 53. In this embodiment, it is also predetermined that a valid label will, when ready by the label reader, cause a resultant first pulse of one sense an a resultant last pulse of opposite sense in the digital pulse train at terminal C. Thus, at the time the valid label signal appears on line 55*a* to thus qualify gates 58 and 59 the first digit contained in shift register 53 will be of opposite sense from the last digit contained therein. Thus, only one of the AND gates 58 or 59 will be opened and an output signal will appear respectively either on line 58*a* or 59*a*. An output signal on line 59*a* will be applied to gating means 60 to thereby sample the digital pulse train in shift register 53 and to store it in identical form thereto in either storage register 65 or 66 depending on whether gating means 63 or 64 is qualified by flip-flop 62 as will be explained below. If alternately, the output signal appears on line 58*a* which is thus applied to gating means 60, the information stored in shift register 53 will be sampled and stored in a reverse order in either storage register 65 or 66 depending on whether gating means 63 or 64 is qualified. The form of gating means required to perform the functions of gating means 60 is well known to those skilled in the art and need not be described fully here. Briefly, gating means 60 is suitably comprised of two sets of gates, the first set being qualified by the signal on line 59*a* and which gates sample directly and in parallel by bit format the train stored in shift register 53. The second set of gates are qualified by the signal on line 58*a* and sample in parallel by bit format but in reverse order the train stored in shift register 53. Gating means 63 and 64 are each comprised of a simple plurality of gates which allow the train in parallel by bit format passing through gating means 60 to continue in that same format into storage register 65 or 66 depending on whether gates 63 or 64 are qualified. It should now be obvious that a label being read may be oriented so as to be scanned in either direction across its face with the logic circuitry rearranging the resultant binary digital pulse train into a predetermined order.

Of course, if at the time the valid label signal appears on line 55a the same sense digit appears both in the first and last digit of shift register 53 it is an indication for the embodiment here described that an invalid reading has been taken. At that time, and depending upon the sense of the digits in the first and last place of shift register 53 either both gates 58 and 59 will remain closed and hence gating means 60 will remain ineffective or alternately gate 58 and 59 both will open and signals will appear on lines 58*a* and 59*a* simultaneously. In this latter case AND gate 70 will open and will apply a disabling signal along line 70a to thus inhibit gating means 60 so that the invalid pulse train in shift register 53 will not be sampled. The last described operation further improves the reliability of the label reading. Whenever a signal appears on line 58*a* or 59*a* it is passed through Exclusive OR gate 72 to trigger flip-flop 62. Of course, if no signals appear on lines 58*a* and 59*a* or if signals appear on both lines simultaneously indicating that an invalid label has been read, then no signal will pass through Exclusive OR gate 72 at that time. In a first state flip-flop 62 qualifies gating means 63 to allow the contents of shift register 53 to be entered into storage register 65 when gating means 60 is qualified and in the alternate state flip-flop 62 qualifies gating means 64 so as to enter the contents of shift register 53 into storage register 66 when gating means 60 is qualified. It should now be obvious that two successive valid readings of a single label will cause identical binary digital trains to be stored in storage registers 65 and 66. The translational speed of conveyor 12 and the rotational speed of mirror 22 in FIG. 1 are interrelated so to ensure that each label passing through the label reader will be scanned a minimum of two times. Accordingly, a valid reading will be obtained only when during some portion of the reading period identical trains are contained in storage registers 65 and 66. This state is determined by comparator means 75 which suitably compares in parallel the train in storage register 65 with the train in storage register 66. If this comparison is favorable, an output signal is generated by the comparator means on terminal 35, which terminal is also seen in FIG. 1. It is the general function of the invention to provide this output signal on terminal 35 with a high degree of confidence that a valid label has been properly read and that a pulse train which corresponds to the informational content of the label is contained in duplicate in storage registers 65 and 66. The further processing of this valid pulse train is not part of the present invention, however, it should now be obvious that additional means can be provided which in response to the signal on terminal 35 will sample this valid pulse train for further use, for example, storing the pulse train in an escort memory, directing the further movement of the package whose label was read, accounting, or other like purposes. The comparator 75 output signal is also suitably used to clear registers 65 and 66 after a short delay introduced by delay 77 so that these registers will be in condition for a reading of the next label presented to the label reader.

Figures 3, 4:
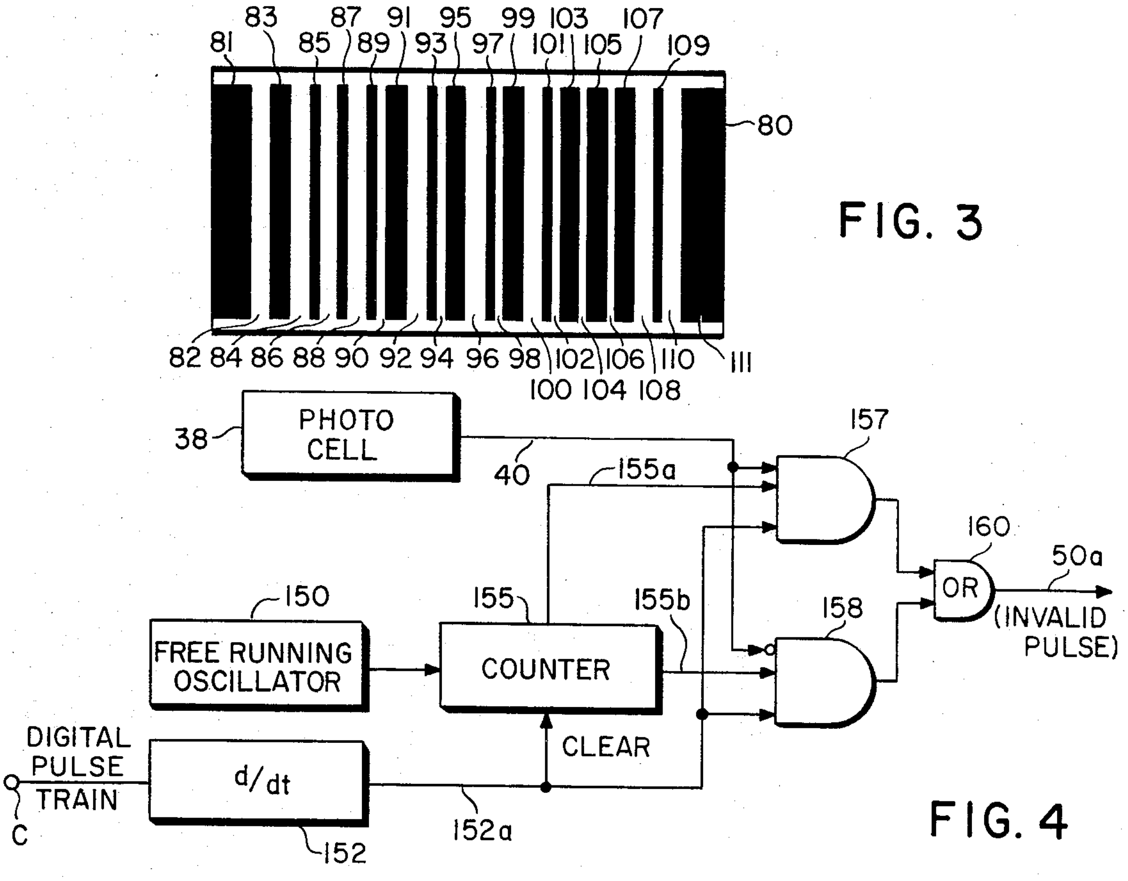
FIG. 3 shows a typical label suitable for use with the invention.
FIG. 4 is a block diagram showing more particularly the pulse sampler of FIG .

A label suitable for reading by the label reader just described is shown in FIG. 3 reference to which should now be made. The label of FIG. 3 will be seen to consist of 16 black bars alternating with 15 white bars. Certain of the black bars, for example bars 85, 87 89, 93, 97, 101 and 109 are seen to be a single unit in width. A second group of black bars, for example bars 83, 91, 95, 99, 103, 105 and 107 are seen to be two units in width. Bars 81 and 111 on either end of the label are four units in width. White bars 90, 94, 98, 102, 104 and 106 are a single unit in width, while white bars 82, 84, 86, 88, 92, 96, 100, 108 and 110 are two units in width. The surface of the label is generally dispersively reflective with the black bars being generally light absorbent and the white bars being generally light non-absorbent. Beam 23 of FIG. 1 as it scans across a label will thus be absorbed when it strikes a black bar and be dispersed when it strikes a white bar.

Although the bars are shown to be of single and double units in width, this relationship is not essential to the proper working of the invention. It will be shown below that basically two widths of black bars, for this particular embodiment, are required to thus pulse width modulate a resultant pulse train in binary form. It is also shown below that the pulse widths of a resultant train, and hence bar widths, should be within a certain predetermined range to allow detection of invalid pulses (pulses which are shorter or longer than could be expected from scanning a label).

Figure 8:
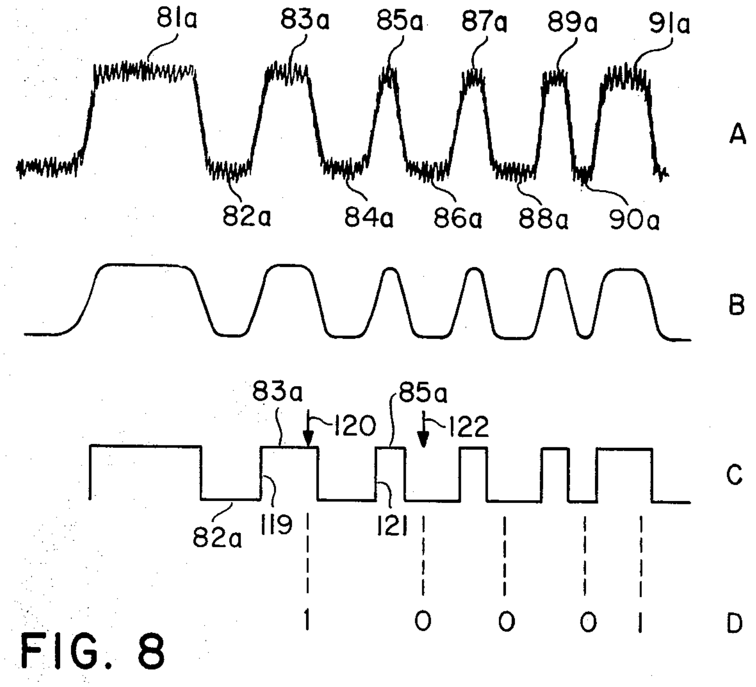
FIG. 8 illustrates the form of the electronic signal at certain points in the logic block diagram of FIG. 2.

The waveforms of FIG. 8 (reference to which should now be made) illustrate the waveforms appearing at the respective terminals of FIG. 2 as the label of FIG. 3 is scanned from left to right, that is from bar 81 towards bar 111. In this embodiment the high level signal results when beam 23 of FIG. 1 is observed by phototransducer 30 as striking a black bar and the low level signal results when beam 23 is observed as striking a white bar. It can be seen that pulses 85*a*, 87*a* and 89*a* are pulses of a single unit width which correspond to black bars 85, 87 and 89 while pulse 90*a* which is also a single unit width but in an opposite sense corresponds to white bar 90. In like manner pulse 81*a* which is four units in width corresponds to wide black bar 81 and pulses 83*a* and 91*a* which are two units in width correspond to black bars 83 and 91. Oppositely sensed pulses 82*a*, 84*a*, 86*a*, and 88*a* of two units width correspond to white bars 82, 84, 86 and 88. For clarity the results of scanning fully across the ticket are not shown, the pulses that would result from such scanning now being obvious.

Referring again to FIG. 8C, which is the pulse train which appears at the input of pulse sampler 50, clock generator 52 and shift register 53 of FIG. 2, and considering that a data sample is taken a preselected time period after beam 23 moves from a white bar to a black bar (by means to be described) it can be seen that this movement of beam 23 from a white bar to a black bar can be represented by the transition 119 from pulse 82*a* which results from scanning a white bar to pulse 83*a* which results from scanning a black bar. Thus, at the time indicated by line 119, clock generator 52 (referring now also to FIG. 2) begins a delay period and generates a timing pulse on line 52*a* at a time represented by arrow 120 on FIG. 8C, which timing pulse allows the information present at the input of shift register 53 to be entered therein. In the specific example being discussed pulse 83*a* is now sampled and entered into shift register 53. It can be seen that pulse 83 because of its width will be sampled at a high level. Thus it can be considered for the purposes of this discussion that a digital 1 will be entered into the shift register at this time. At the next positive going transition in FIG. 8C, that is at line 121, clock generator 52 again initiates the delay period and generates a resultant timing signal on line 52*a* at the time indicated by arrow 122. At that time pulse 85*a* is being sampled but it can be seen that this latter pulse has already terminated thus it can be considered that a digital 0 will now be entered into shift register 53. In like manner the other information encoded on the label is entered into the shift register. The digital information corresponding to FIG. 8C pulse train is seen in FIG. 8D, this being the informational content on the first part of the label of FIG. 3 and which is entered along with the other information encoded on the label.

Figure 5:
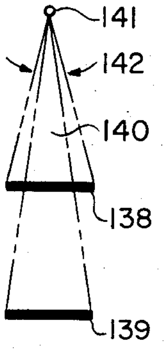
FIG. 5 is a geometric representation useful in explaining how a label can be incorrectly read if it is read at varying distances from a label reader which is not responsive to this varying distance.
Figure 6:
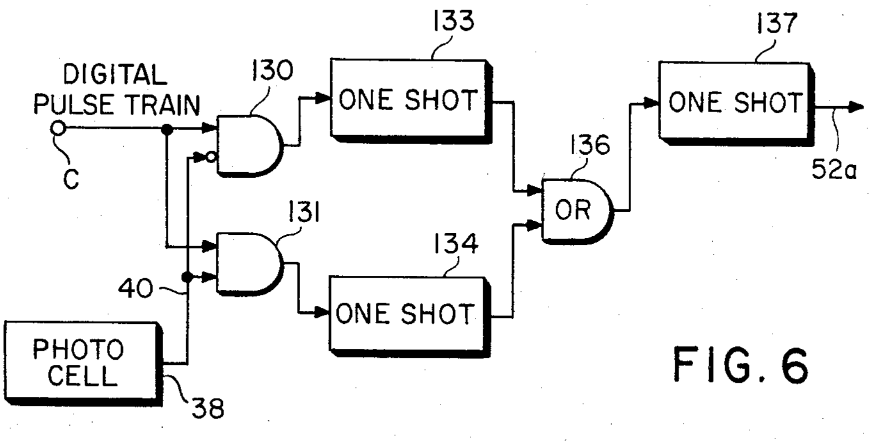
FIG. 6 is a block diagram showing more particularly the clock generator of FIG. 2 and which illustrates how the label reader of this invention automatically compensates for the varying distances that a label may be presented to the label reader to thus eliminate the possible errors explained with respect to FIG. 5.
Figure 7:
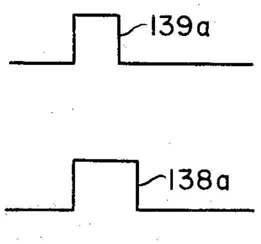
FIG. 7 illustrates resultant electronic pulses obtained by scanning an identical width label bar at various distances from the label reader.

Refer now to FIG. 6 wherein there is seen in greater detail the elements comprising clock generator 52. The pulse train appearing on terminal C of FIG. 2 is applied to both AND gates 130 and 131 with the output from photocell 38 being applied via line 40 also to these AND gates, as an inhibiting signal to AND gate 130 and as a qualifying signal to AND gate 131. It can thus be seen that only one of these AND gates will be fully qualified at any one time. Assuming first that photocell 38 is energized so that AND gate 131 is qualified, the pulse train will pass therethrough and each positive going excursion thereof triggers one-shot 134 whose output pulse travels through OR gate 136 to one-shot 137, which is triggered in response to the trailing edge of the pulse applied thereto. The period of the one-shot 134 output pulse is the delay period corresponding to the time difference between line 119 and arrow 120 in FIG. 8C. One-shot 137 when triggered generates a short output timing pulse along line 52*a* which is also seen in FIG. 2. The purpose of the short timing pulse has been fully explained earlier. Referring now also to FIG. 5 and 7 wherein reference numeral 141 represents the effective observation center of the label reader as a label passes through the reader and is scanned. Reference numeral 138 indicates a black bar on a label wherein the label is closely placed to observation center 141 and wherein reference numeral 139 refers to a black bar on a label which is more remotely distanced from observation center 141. Both bars are the same width. This simple geometric figure shows that the angle 142 through which bar 131 is observed while being scanned is much larger than angle 140 which is the angle through which bar 139 is observed while being scanned. In FIG. 7 there are seen the pulses resulting from the observation of bars 138 and 139 wherein the pulse 139*a* corresponding to the scanning of bar 139 is of shorter time duration than pulse 138*a* which is the pulse resulting from scanning of bar 138. Thus, although bars 138 and 139 are the same width the pulses resulting from the scanning thereof will vary in width in accordance with their distance from the observation center. It should now be obvious that to increase the depth of field of the label reader it is extremely advantageous to vary the delay period introduced by one-hot 134 in Fig. 2 in accordance with the distance of the label being read from the observation center. It will be remembered that in the discussion of FIG. 1 it was noted that a package whose label was being read and which had a height greater than *h*, which was the height of photocell 38 above conveyor 12, would intercept the beam of light from light source 37 to photocell 38 thus generating an output along line 40. Of course, this package whose height is greater than *h* would present its label for reading closer to the observation center than a package whose height was less than *h*. Accordingly, and referring again to FIG. 6, when the light to photocell 38 is interrupted indicating that a tall package is passing through the reader AND gate 131 closes and gate 130 opens so that the pulse train is now applied to the input of one-shot 133. It should also be obvious that the period of one-shot 133 output pulse should be longer than the period of 134 output pulse to compensate for the changed distance of the label from the observation center thus permitting the label reader to have greater field depth.

Refer now to FIG. 4 which illustrates in greater detail pulse sampler 50 of FIG. 2 and wherein a free-running oscillator 150 continually strobes counter 155. The terminal C pulse train of FIG. 2 is applied to differentiating circuit 152 which in response thereto generates along line 52*a* a train of sharp pulses corresponding to the transitions of the digital pulse train. These sharp pulses are also rectified so that they are all of the same electrical sense, a sharp pulse for each negative and positive going transition in the terminal C pulse train resulting. Each sharp pulse is used to clear counter 155 and additionally is applied as a qualifying signal to AND gates 157 and 158. Thus, at the beginning of each pulse, whether a positive or negative pulse, counter 55 is cleared so that the count accumulated in this counter at the time of the next sharp pulse corresponds to width of the preceeding pulse in the digital pulse train. It will also be noted that photocell 38 (also seen in FIG. 2) is arranged to apply a qualifying signal to gate 57 and inhibiting signal to gate 158 in the same manner and for the same reasons as has been fully explained in FIG. 6. It is predetermined by the system designer by setting the frequency of the free-running oscillator 150 that counter 151 will attain a certain predetermined range of counts if a valid pulse is present on terminal C. Accordingly, at all other counts, counter 155 generates an output along line 155*a* so that if a sharp pulse occurs while this invalid count is present in counter 155, indicating that an invalid or improper bar has been presented to the label reader, the sharp pulse on line 152*a* passes through now open gate 157 and through OR gate 160 onto line 50*a* which is also seen in FIG. 2, this pulse now comprising the invalid pulse signal explained with reference to FIG. 2. It was earlier explained with reference to FIGS. 5, 6 and 7 how the distance of a label from the label reader observation center will vary the width of pulses on terminal C. Thus, as was earlier explained with respect to FIG. 6, a tall package which presents its label closer to the observation center will trigger photocell 38 thus now disqualifying gate 157 and qualifying gate 158. Under these new conditions it will be known to the system designer that valid pulses will cause counter 151 to attain a different range of counts, with a counter output signal appearing on line 155*b* whenever the counter is not within this range of counts. In this latter case, the invalid pulse will proceed through gate 158 and 160 to line 50*a*. Refer back to the label of FIG. 3. Those bars of one and two units width are valid bars which will result in valid pulses when sampled. Bars 81 and 111, the wider bars at each end of the label are invalid and result in invalid pulses when read. Hence an invalid pulse signal will be generated to clear counter 55 and register 53 before a label is read regardless of its orientation on the package.

Figure 10:
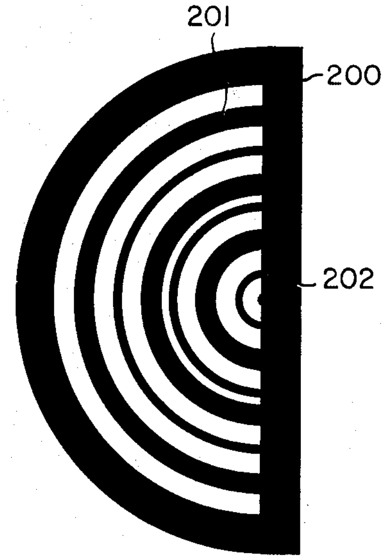
FIG. 10 shows an example of a semi-circular label suitable for reading by the label reader.

Having the present teachings at hand it should now be obvious to one skilled in the art that certain modifications and alterations can be made thereto without departing from the spirit of the invention. In particular, and as an example, it should now be obvious that additional photocells similar to photocell 38 could be added to the label reader with additional circuitry added in cascade with the circuitry shown to further increase the depth of field of the label reader. It can also be seen that should a label pass through the reader at a skewed angle the pulse widths will vary somewhat from those pulses which result from the label passing squarely through the reader. The limit of the amount of skewing possible is that angle of skew which causes a valid bar to result in an invalid pulse. It should be obvious that increasing the number of photocells compensates somewhat for this skewing angle and will allow greater angles of skew without causing invalid pulses to be generated. The allowable angle of label skew can be increased even further by the use of a circular or semi-circular label such as that illustrated by FIG. 10, reference to which should now be made. Note that wide black bar 200 edging the label will result in an invalid pulse at the beginning of the label scan regardless of from what direction the label is scanned. Also note that a sampling of black bar 201 results in a binary "1" being entered into shift register 53 and a reading of black bar 202 results in a binary "0". Thus, the digits at either end of a resulting pulse train will be of opposite sense. The design of a circular label should now be obvious. Accordingly, this invention is intended to encompass all modifications and alterations of the basic teachings herein and is to be limited solely by the scope and true spirit of the appended claims.

The invention claimed is:

1. Recognition means for converting a visual pattern into electrical signals comprising:

a source of a coherent beam of light;

means for scanning said beam of light along a predetermined path, said pattern to be recognized being in said predetermined path;

transducer means for converting light signals exposed thereto into output electrical signals;

means for exposing said predetermined path to said transducer;

said visual pattern comprising a generally plane surface having light absorbent and light non-absorbent areas, said pattern being exposed in said predetermined path while said beam scans along said predetermined path for at least a first and second scan and wherein said transducer means comprises:

phototransducer means for converting light signals exposed thereto during said first scan into a first train of electrical pulses, said first train being correlated to the position of said light absorbent and light non-absorbent areas in said predetermined path during said first scan, and for converting light signals exposed thereto during said second scan into a second train of electrical pulses, said second train being correlated to the position of said light absorbent and light non-absorbent areas in said predetermined path during said second scan;

means comparing said first and second trains for generating said output electrical signals;

said comparing means comprising:

a first register for storing said first pulse train;

a second register for storing said second pulse train; and, means responsive to said first stored pulse train and said second stored pulse train for generating said output electrical signals.

2. A recognition system for converting a pattern into electrical output signals comprising:

a source of illuminating energy;

means for scanning said energy along said pattern as said pattern and said source move relative to one another;

transducer means for converting energy reflected from said pattern into electrical signals;

said pattern including energy absorbent areas and energy non-absorbent areas which are successively illuminated by said energy during at least two complete scans of said pattern;

said transducer converting said energy to a first train of electrical pulses during the first of said scans and to a second train of electrical pulses during the second of said scans, said pulse trains having pulses of different amplitudes representative of said absorbent and non-absorbent areas;

means for counting the pulses in said first and second pulse trains for determining that each of said pulse trains contains an equal number of pulses to thereby determine said pulse trains to be valid;

means for temporarily storing said first and second pulse train until said counting means determines them to be valid;

first storage register for storing said first pulse train when determined to be valid;

second storage register for storing said second pulse train when determined to be valid;

and means for comparing said first and second valid pulse trains and generating said output electrical signals.

3. Means as recited in claim 2 with additionally means responsive to said output electrical signals for clearing said first and second storage registers.

4. Means as recited in claim 2 wherein said energy is coherent light and wherein said energy absorbent and energy non-absorbent areas have a dimension intercepted by said predetermined path within a predetermined range whereby the resultant range of said pulse train pulse widths is within a predetermined range, all pulses having a pulse width outside said predetermined range being invalid pulses, said first named means additionally comprising a pulse sampler responsive to invalid pulses for generating an invalid pulse signal.

5. Means as recited in claim 4 wherein said counting means includes means responsive to said invalid pulse signal for clearing itself.

6. Means as recited in claim 5 wherein said temporary storing means includes means responsive to said invalid pulse signal for clearing itself.

7. In means for reading a label having alternate light absorbent and light non-absorbent areas, said reading means including a scanning light source for repetitively scanning a beam of light along a predetermined path at a preselected scanning rate, said label being in said path whereby said alternate areas are successively illuminated by said scanning beam, the time duration an area is illuminated being dependent at least in part upon the distance from said label to a transducer which observes said label as illuminated by said scanning beam and which is responsive to illumination of said label for generating electrical signals having a characteristic correlated to the time duration an area is illuminated, an improvement comprising;

logic means for processing said electrical signals in accordance with said characteristic;

means responsive to the distance of said label from said transducer for varying the response of said logic means to said characteristic;

said means for varying the response of said logic means comprising photocell means for generating signals indicative of the distance of said label from said transducer, said logic means including means responsive to said characteristic for sampling said electrical signals, the response of said sampling means to said characteristic being determined by said photocell means signals.

8. A system for recording a pattern having a group of energy absorbent areas and a group of energy non-absorbent areas, said absorbent and non-absorbent areas being alternatively arranged and at least one of said groups having areas of at least two different widths;

a scanning energy source for repetitively scanning a beam of energy across said pattern so that said absorbing and non-absorbing areas are alternately and successively illuminated across the width, the illumination time of said areas being dependent upon the distance between said pattern and said energy source;

transducer means for receiving energy reflected from said areas as said pattern is scanned and converting said reflected energy into electrical pulse trains, the pulses of said pulse trains having a width dependent upon said illumination time of said area width so that the widths of pulses result in said pulse train being uniquely representative of said pattern;

means responsive to said distance to vary the response of said system in accordance with said distance; and logic means for processing said electrical pulse trains in accordance with said width comprising:

delay means triggered when the pulses comprising said pulse train attain a predetermined state for generating first clock signals a predetermined delay time after being triggered; and register means responsive to said clock signals for sampling said pulse train at that time.

9. Label reading means as recited in claim 8 wherein said means for varying the response of said logic means comprises means for varying said predetermined delay time according to the distance of said label from said transducer.

10. Label reading means as recited in claim 9 wherein said label has a predetermined number of said light absorbent and light non-absorbent areas whereby a pulse train resulting from a single scan of said label will include a predetermined number of pulses and including means for counting the number of pulses in said pulse train resulting from a single scan of said label, the number attained by said counter being indicative of, at least in part, whether a valid label has been scanned.

11. Label reading means as recited in claim 8 with additionally pulse width sampling means for generating an invalid pulse signal when the width of the pulses comprising said pulse train lie without a range encompassing said first and second pulse widths.

12. Label reading means as recited in claim 11 wherein said logic means includes means responsive to said invalid pulse signal for returning said logic means to an initial state.

13. Label reading means as recited in claim 11 wherein said pulse sampling means comprises:

a counter including counter clearing means responsive to a predetermined portion of the pulses comprising said pulse train for clearing said counter; and, a free running oscillator for strobing said counter, the count accumulated by said counter being a measure of pulse train pulse width, said counter generating said invalid pulse signal whenever it has accumulated a count corresponding to a pulse width lying without said range of pulse widths encompassing said first and second pulse widths.

14. Label reading means as recited in claim 13 wherein said logic means includes:

gate means opened when said counter is cleared for passing said invalid pulse signal if it is at that time being generated by said counter; and, means responsive to said invalid pulse signal if passed through said gate means for returning said logic means to an initial state.

15. In means for reading a label having alternate light absorbent and light non-absorbent areas, said reading means including a scanning light source for repetitively scanning a beam of light along a predetermined path at a preselected scanning rate, said label being in said path whereby said alternate areas are successively illuminated by said scanning beam, the time duration an area is illuminated being dependent at least in part upon the distance from said label to a transducer which observes said label as illuminated by said scanning beam and which is responsive to illumination of said label for generating electrical signals having a characteristic correlated to the time duration an area is illuminated, an improvement comprising;

logic means for processing said electrical signals in accordance with said characteristic;

means responsive to the distance of said label from said transducer for varying the response of said logic means to said characteristic;

means wherein said electrical signals comprise binary level signals, a first level signal being generated in response to the illumination of a light absorbent area and a second level signal being generated in response to the illumination of a light non-absorbent area, the electrical signals thus comprising a pulse train pulse width modulated in accordance with the time duration an area is illuminated; and means wherein at one of the groups comprising said light absorbent areas or said light non-absorbent areas is comprised of a first subgroup of areas having a first predetermined dimension in said path and a second subgroup of areas having a second predetermined dimension in said path, and with additionally pulse width sampling means for generating an invalid pulse width signal when the width of the pulses comprising said pulse train lie without a first predetermined range of pulse widths.

16. Label reading means as recited in claim 15 wherein said pulse width sampling means comprises:

a free running oscillator;

a counter strobed by said free running oscillator and accumulating a count proportional to time, said counter including means for resetting itself in response to the leading edge of pulses in said pulse train, said counter generating said invalid pulse width signal whenever it has accumulated a count corresponding to a pulse width without said first predetermined range.

17. Label reading means as recited in claim 15 wherein said means for varying the response of said logic means comprises means for varying the range of pulse widths without which said invalid pulse width signal is generated.

18. Label reading means as recited in claim 17 wherein said pulse width sampling means comprises:

counting means accumulating a count proportional to time and including means for clearing itself in response to the leading edge of pulses in said pulse train, said counting means generating said invalid pulse width signal whenever it has accumulated a count corresponding to a pulse width without said first predetermined range, said means for varying the response of said logic means comprising means for varying said counting means according to the distance of said label from said transducer whereby the count to be accumulated by said counting means to generate said invalid pulse width signal is varied.

19. In a label reader generating a binary pulse width modulated pulse train of a predetermined number of pulses encoding the informational content of a label, logic means for certifying the validity of a label reading comprising:

pulse width sampling means for generating an invalid pulse signal when the width of a pulse in said pulse train is without a predetermined range;

first counter means cleared by said invalid pulse signal and strobed by said pulse train so as to accumulate a count related to the number of pulses in said pulse train for generating a valid label signal when said first counter means accumulates a count corresponding to said predetermined number of pulses;

a first storage register means for sampling said pulse train and storing said sampled pulse train;

a second storage register first gating means responsive to a first said valid label signal corresponding to a first generating of said binary pulse width modulated pulse train for transferring the contents of said first storage register into said second storage register;

a third storage register;

second gating means responsive to a second said valid label signal corresponding to a second generating of said binary pulse width modulated pulse train for transferring the contents of said first storage register into said third storage register; and, means comparing the contents of said second and third storage registers to generate an output electrical signal which certifies the validity of the label reading.

20. Logic means as recited in claim 19 with additionally means responsive to said output electrical signal for generating a clearing signal, said second and third storage registers being responsive to said clearing signal for returning to an initial state.

21. Logic means as recited in claim 19 wherein the width of pulses in said pulse train varies in accordance with a determinable variable and with additionally:

means for sensing said determinable variable to generate error signals; and, means responsive to said error signals for varying said predetermined range in accordance with said determinable variable.

22. Logic means as recited in claim 19 wherein said first storage register means comprises means responsive to the width of pulses in said pulse width modulated pulse train for converting said pulse width modulated pulse train into a binary digital pulse train comprising said sampled pulse train, said first, second and third registers comprising binary digital storage registers and wherein the width of pulses in said pulse width modulated pulse train varies in accordance with a determinable variable, said logic means additionally comprising:

means responsive to said determinable variable for generating error signals; and, means responsive to said error signals for varying the response of said converting means to the width of pulses in said pulse width modulated pulse train.

23. Logic means as recited in claim 22 with additionally means responsive to said error signals for varying said predetermined range in accordance with said determinable variable.

24. Logic means as recited in claim 23 wherein the distance of said label being read from said label reader comprises said determinable variable, said means for generating error signals comprising photocell means detecting said distance for generating electrical error signals comprising said error signals.

25. Recognition means for converting a visual pattern into electrical signals comprising:

a source of a coherent beam of light;

means for scanning said beam of light along a predetermined path, said pattern to be recognized being in said predetermined path;

transducer means for converting light signals exposed thereto into output electrical signals;

means for exposing said predetermined path to said transducer;

said visual pattern comprising a surface having alternate light absorbent and light non-absorbent areas disposed in said predetermined path whereby said areas are consecutively illuminated by said scanning beam of light and wherein said transducer means comprises:

phototransducer means for converting light signals exposed thereto into a train of electrical pulses, said exposing means exposing said predetermined path to said phototransducer means, the time duration a scanned area is illuminated determining the pulse width of a resultant pulse of said pulse train;

logic means responsive to the widths of the pulses in said pulse train for generating said output electrical signals; and means responsive to the distance of said pattern from said phototransducer for varying the response of said logic means to said pulse widths.

26. A system for generating a code of output pulses representative of a pattern comprising:

A pattern having a first group of areas of one energy reflecting capability and a second group of areas of a different energy reflecting capability, said areas being two-dimensional and the areas of at least one of said groups being divided into a first subgroup having a first dimension along an axis and a second subgroup having a second dimension along said axis;

means for scanning said pattern with energy so that energy is reflected from said pattern with different intensity in accordance with the reflecting capabilities of said areas;

means for receiving said reflected energy and generating a pulse train which varies as a function of said intensity differences, so that said pulse train has transitions between two amplitudes as said scanning energy moves from an area of one reflective capability to an area of another reflective capability and the widths of the pulses of said pulse train are dependent upon the dimensions of said areas in the direction of said scanning; and means responsive to each transition from one of said amplitudes to the other of said amplitudes for generating logic output pulses correlated to the widths of said areas to thereby generate said code of output pulses, said means responsive to said transitions including;

delay means, said delay means being actuated by said transitions of said pulse train from one of said amplitudes to the other of said amplitudes; and means for generating the code pulses of said code, said code pulses having a logic state dependent upon the amplitude of said pulse train at the termination of the period established by said delay means.

27. The system of claim 20 wherein there is relative motion between said system and said pattern, said axis and the direction of said scanning nominally occuring along a line substantially parallel to the direction of said motion.

28. The system of claim 20 wherein there is relative motion between said system and said pattern, said axis and the direction of said scanning nominally occuring along a line substantially perpendicular to the direction of said motion.

29. The system of claim 20 wherein said pattern is rectangular and said areas are parallel to two sides of said rectangle.

30. The system of claim 20 wherein said pattern is semi-circular and said areas are concentric about the center of the diameter of said pattern.

31. The system of claim 20 wherein said pattern is circular and said areas are concentrically arranged on said pattern.

* * * * *

UNITED STATES PATENT OFFICE

CERTIFICATE OF CORRECTION

Patent No. 3,676,645 Dated July 11, 1972

Inventor(s) William E. Fickenscher and James E. Harris

It is certified that error appears in the above-identified patent and that said Letters Patent are hereby corrected as shown below:

In Claims 27, 28, 29, 30 and 31, line 1 "20" should read ----26---.

Signed and sealed this 19th day of December 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
U.S. GOVERNMENT PRINTING OFFICE 1969 O—366-334